L. L. Reynolds.
Weaving Heddles.
No. 23,393.
Patented Mar. 29, 1859.
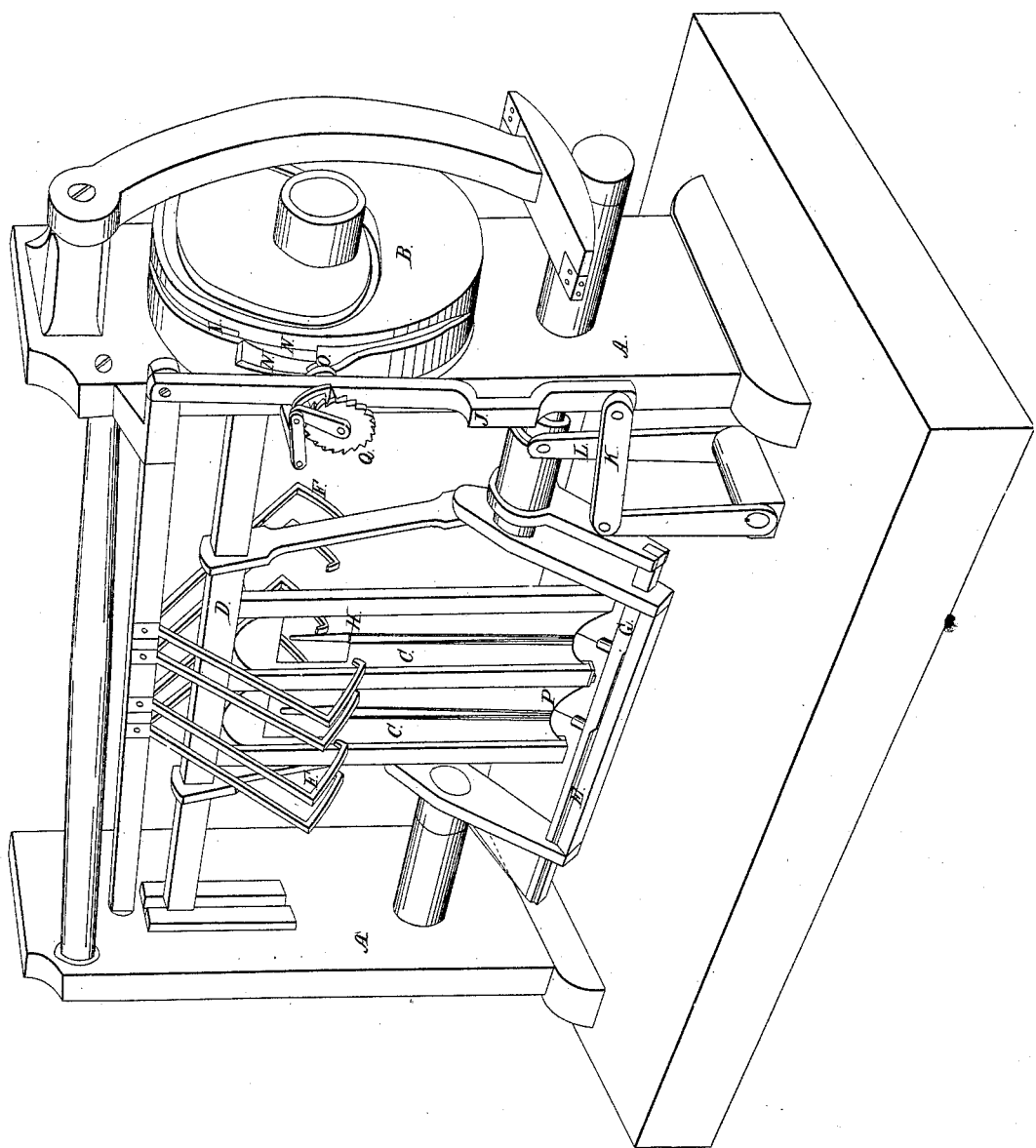
Witnesses.
George Reynolds
Newton S. Reynolds
Inventor.
Lewis L. Reynolds

UNITED STATES PATENT OFFICE.

LEWIS L. REYNOLDS, OF MANCHESTER, NEW HAMPSHIRE.

MACHINERY FOR FILLING LOOM HARNESS-NEEDLES.

Specification of Letters Patent No. 23,393, dated March 29, 1859.

*To all whom it may concern:*

Be it known that I, LEWIS L. REYNOLDS, of Manchester, in the county of Hillsboro and State of New Hampshire, have invented certain new and useful Improvements in Machines for Filling Loom Harness-Needles, of which the following is a full and exact description, reference being had to the annexed drawing, making a part of this specification.

My invention of certain improvements in machines for filling harness needles, is designed to effect the filling the needle as full of twine as is done by hand, and also the distributing of the twine evenly around the end P, of the needle. The filling of the needle full (which is not done by any other machine to my knowledge) is very important, as it enables the person using the needle to do a greater amount of work with the same number of needles, thereby avoiding the necessity of joining the twine so often, which is a serious objection, as each knot in joining must be tied so as to come in a particular place in the harness. The distributing of the twine evenly around the end P, of the needle is also important, as it insures a firmly filled needle, whereas in other machines the twine being piled continuously in one or at most two places, it is piled up so prominent that upon a person using the needle the twine will roll from its prominent position, and will consequently be slack.

My invention consists of a bail E, for carrying the twine from side to side of the needle, hooks F for receiving the same, taking it through the eye, over the tongue and depositing it upon the outer sides of the score of the needle. Also an intermittent rotating oval pin O, and cams A, the joint action of which causes the twine to be evenly laid around the end P, of the needle. The devices I have arranged for this purpose I will now proceed to describe.

A are standards which support the moving parts.

B is a wheel having three cam grooves (one upon each side, and one upon its periphery) by which all of the movements are effected.

C, C, are the needles to be filled, they are held in a frame D, which frame has a vertical movement transmitted to it by means of the bail E, and its connections.

F are hooks which enter the eye of the needle from one side, while the traversing bar G, of the bail E, being upon the opposite side, carries the twine across the points of said hooks, and immediately upon the twine being carried across the hooks, they are withdrawn from the eye, taking the twine with them. The bail E, then swings to the other side of the needles, and being connected with the frame D, it raises it, with the needles C, until the bottom of the score H, comes up to, and slips the twine from the hooks F, and leaves the same around the tongue of the needle, after which, the bail E having passed from the one side to the other of the needle, the hooks F upon the opposite side, enter the eye, and the same operations are gone through with as before.

It will be observed, that the hooks F, deposit the twine upon the outer sides of the score of the needles, this is very important, and constitutes in fact the essence of the improvement as by depositing it on the outer sides of the score, the first strand will be drawn up to the tongue, the next strand will be drawn up to the previous one, and so on, until the whole width of the score is filled out, thus carrying up the twine the whole width of the score, as fast as the needle is filled, which is not the case with machines that merely dip the twine over the point of the tongue, as in that case instead of filling up the needle the whole width of the score, it fills one layer the whole length of the tongue, which layer not being smooth like the tongue itself causes so much friction that a second layer will not slip down over the previous one, consequently the needle will not be filled full.

I will now proceed to describe how the oval pin O, and cams N, effect the laying of the twine uniformly around the end P, of the needle. It is to be understood that the bar G must be at one or the other extreme ends of its stroke at the time of the hooks entering the eye of the needle, therefore during the passage of the bail E, from the eye, to the bottom, or end P, of the needle the bar G must receive the proper degree of motion to effect the laying of the twine one strand nearer to, or farther from the center of the scallop P, and after the passing of the bail E, under the bottom of the needle the bar G must return to its former position. To effect this, suppose the pin O to be in such a position that its longer diameter shall be vertical, and its shorter diameter horizontal, in this position the cam N, will on passing the pin O, just touch it, but will not move the arm J, consequently the first strand will be laid on the outer side of the scallop P, during the next vibration of the bail E, the ratchet Q, which is firmly fastened to pin O, will be rotated the extent of one tooth which will carry the point of contact of the pin O, with cams N, farther from the center of said pin, so as the cam N next passes it, it will move it sufficiently to cause the bar G to lay the next strand of twine inside the first, or one strand nearer the center of the scallop, and thus it will proceed, the ratchet wheel Q being rotated the distance of one tooth to every other vibration of bail E carrying the point of contact each time of pin O far enough from its center to cause the twine to be laid one strand nearer the center of the scallop, this it will continue to do until the longer diameter of pin O is horizontal, at which time the twine will be laid directly around the center of the scallop. As the pin continues to be rotated it will be perceived that the point of contact of the pin with the cams will gradually recede, which will cause the laying of each succeeding strand of twine one strand farther from the center of the scallop &c. The bar G, receives the necessary motion for carrying the twine across the hooks F, by means of the cam groove I, in which works a round pin projecting from the pin O, this pin passes through the arm J, by which the motion is transmitted by the rod K, and rocker arms L to the bar G. This groove is made broader at M to allow the arm J to be moved by the cam N independent of said groove, but at the point the cam N ceases to act the groove gradually decreases to its former size, and will therefore as it revolves bring the bar G back to its former position, preparatory to the hooks entering the eye of the needle.

I do not claim the mere passing of the twine over the tongue of the needle as it is old, having been done some twenty years since by a Mr. Wilson, of Lowell, Mass., but—

I claim—

1. The hooks F, or the equivalent thereof, for depositing the twine or cord upon the outer sides of the score of the needle, when combined with a device for delivering the twine or cord to said hooks.

2. I claim the combination of the intermittent rotating oval shaped pin O, with the cam N, or their equivalents for depositing the twine, or cord evenly around the end P, of the needle.

LEWIS L. REYNOLDS.

Witnesses:
GEORGE REYNOLDS,
NEWTON S. REYNOLDS.